J. A. DUNKLEY.
NUT LOCK.
APPLICATION FILED JULY 9, 1917.
1,268,700.
Patented June 4, 1918.
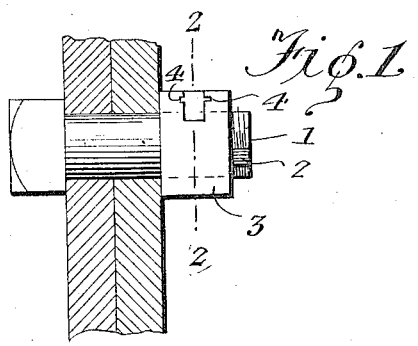
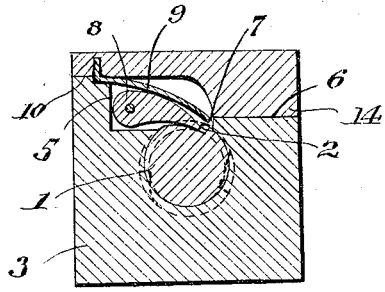
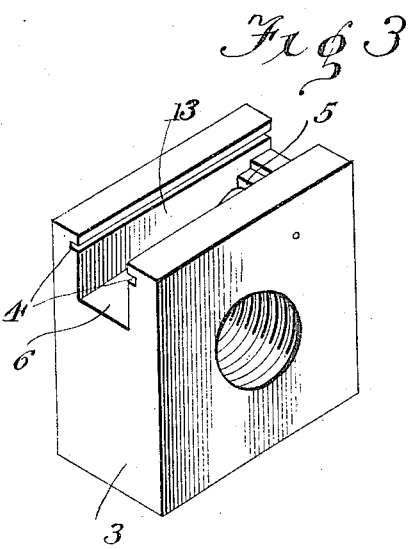
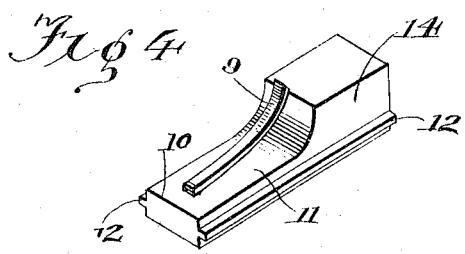
WITNESS
H. R. Edmonston
INVENTOR
J. A. Dunkley
BY Victor J. Evans
ATTORNEY

UNITED STATES PATENT OFFICE.

JAMES ALLEN DUNKLEY, OF LUXORA, ARKANSAS.

NUT-LOCK.

1,268,700.　　　　　Specification of Letters Patent.　　Patented June 4, 1918.

Application filed July 9, 1917. Serial No. 179,484.

*To all whom it may concern:*

Be it known that I, JAMES A. DUNKLEY, a citizen of the United States, residing at Luxora, in the county of Mississippi and State of Arkansas, have invented new and useful Improvements in Nut-Locks, of which the following is a specification.

This invention relates to improvements in means for locking a nut upon a bolt, and resides in the construction, combination and arrangement of parts set forth in the following description and falling within the scope of what is claimed.

In the drawing,

Figure 1 is a view of a nut locked upon a bolt in accordance with the present invention.

Fig. 2 is a transverse sectional view approximately on the line 2—2 of Fig. 1.

Fig. 3 is a perspective view of the nut, the dog actuating member being removed, and Fig. 4 is a perspective view of the dog actuating member.

The bolt 1 has its shank provided with spaced longitudinal grooves 2.

The nut 3 is provided, upon one of its sides, with a longitudinally extending channel, the opposite parallel walls of which, adjacent the outer surface of the nut being provided with grooves 4. The channel, adjacent one of the sides or ends of the nut, terminates the shoulder 5 that is disposed a suitable distance below the groove 4, but is arranged a suitable distance below the lower wall 6 of the channel proper. The shoulder is arranged in a line with an opening 7 that communicates with the bore of the nut, and pivotally secured between the side walls of the channel and disposed to have its engaging end passed through the opening 7 to engage with one of the grooves 2 of the bolt 1, when the nut is screwed upon the said bolt, in a dog 8. The outer face of the dog is rounded, as disclosed by the drawings, and the said dog is normally retained in bolt engaging position through the medium of its spring 9 provided upon the under and reduced face 10 of the dog operating member or block 11. The block is of a size to fill the channel and has its side walls provided with longitudinally extending tongues 12 that are received in the grooves 4 of the channel, which is indicated for distinction by the numeral 13.

What I will term the outer portion of the block, upon its under face, is thickened, as at 14, the said thickened portion being of a size to engage with the lower walls 6 provided by the channel 13, the reduced portion being of a size to overlie the wall at the restricted end of the channel.

By reference to the drawings, it will be noted that the spring 9 is in the nature of flat members having one of its ends secured to what I have termed the reduced end of the block 11, the said spring being arranged angularly with respect to the block, that has its free end projecting toward the thickened portion of the block, and as a consequence, when the block is arranged within the channel, the spring will not only contact with the rounded surface of the dog but will engage with one of the walls of the opening 7, the wall opposite that provided with the shoulder 5, whereby to effectively lock the block in the passage and the dog in bolt engaging position.

From the foregoing description, when taken in connection with the drawing, the simplicity and advantages of the construction, will, it is thought, be apparent without further detailed description.

Having thus described the invention, what I claim is:

1. In combination with a grooved bolt and nut therefor, said nut having one of its sides channeled longitudinally and provided with an opening communicating with the bore thereof, a pivoted dog in the said opening designed to engage with one of the grooves of the bolt, a block for closing the channel, an angular spring member carried by the block designed to contact with the dog to retain the same in bolt engaging position to also contact with one of the walls of the opening to retain the block against longitudinal movement in one direction with respect to the channel.

2. In combination with a grooved bolt and a nut screwed upon the bolt, said nut having one of its sides channeled longitudinally, and the said channel being of two dimensions, the opposite walls provided by the channels being grooved longitudinally, said nut having an opening between the shallow and deep walls of the channel which communicates with the bore of the nut, a dog having an outer rounded face pivoted within the said opening and designed to engage with one of the grooves of the bolt, a block for filling the channel having tongues to engage with the grooves in the channel, an angularly disposed spring member secured to the under face of the block and designed to contact with the dog to retain the dog in bolt engaging position and to be also arranged in the path of contact with one of the end walls provided by the opening whereby to retain the block in the channel and the dog in bolt engaging position.

In testimony whereof I affix my signature.

JAMES ALLEN DUNKLEY.